United States Patent [19]

Schultheiss

[11] Patent Number: 4,647,222
[45] Date of Patent: Mar. 3, 1987

[54] TEMPERATURE MEASURING ARRANGEMENT FOR A CAST METAL FURNACE

[76] Inventor: Alfons Schultheiss, Grenzweg 9, D-7543 Engelsbrand-Salmbach, Fed. Rep. of Germany

[21] Appl. No.: 771,678

[22] Filed: Sep. 3, 1985

[30] Foreign Application Priority Data

Sep. 5, 1984 [DE] Fed. Rep. of Germany ....... 3432522

[51] Int. Cl.⁴ .............................. G01J 5/08; G01J 5/10
[52] U.S. Cl. .................................... 374/139; 164/150; 374/129; 374/131
[58] Field of Search ................. 374/129, 131, 139, 178

[56] References Cited

U.S. PATENT DOCUMENTS

| | | | |
|---|---|---|---|
| 1,894,109 | 1/1933 | Marcellus | 374/131 |
| 2,886,970 | 5/1959 | Munker | 374/131 X |
| 3,626,758 | 12/1971 | Stewart et al. | 374/129 |
| 3,745,834 | 7/1973 | Veltze et al. | 374/131 |
| 3,946,610 | 3/1976 | Sartorius | 374/139 X |
| 4,215,577 | 8/1980 | Griffing et al. | 374/178 X |
| 4,355,907 | 10/1982 | Orths et al. | 374/131 X |
| 4,444,516 | 4/1984 | Dostoomian et al. | 374/131 |
| 4,459,044 | 7/1984 | Alves | 374/131 |
| 4,468,771 | 8/1984 | Zhukov et al. | 374/131 |

*Primary Examiner*—Daniel M. Yasich
*Attorney, Agent, or Firm*—Spencer & Frank

[57] ABSTRACT

A temperature measuring device for a metal caster comprises a radiation pyrometer including an IR diode for measuring the head radiation of the metal melt in the crucible of the metal caster. For this purpose, a graphite body dips into the metal melt. The graphite body is seated coaxially around one end of a hollow tube to whose other end is coupled a glass fiber cable which is connected with the IR evaluation diode. The graphite body which dips into the metal melt and simultaneously serves in a known manner as a closing plug for the crucible, now emits thermal radiation into the interior of the tube, such radiation substantially corresponding to the composition of the thermal radiation of a blackbody having the temperature of the metal melt. This thermal radiation is coupled into the glass fiber cable at the other end of the tube and fed to the IR diode for evaluation. This solution permits a relatively inertia-free and very precise measurement, since the measured thermal radiation no longer depends on the type of metal melt employed and, on the other hand, the IR diode employed for the measurement has a certain distance from the caster and is thus free of radiation influences on the part of the caster which could falsify the measuring result.

5 Claims, 1 Drawing Figure

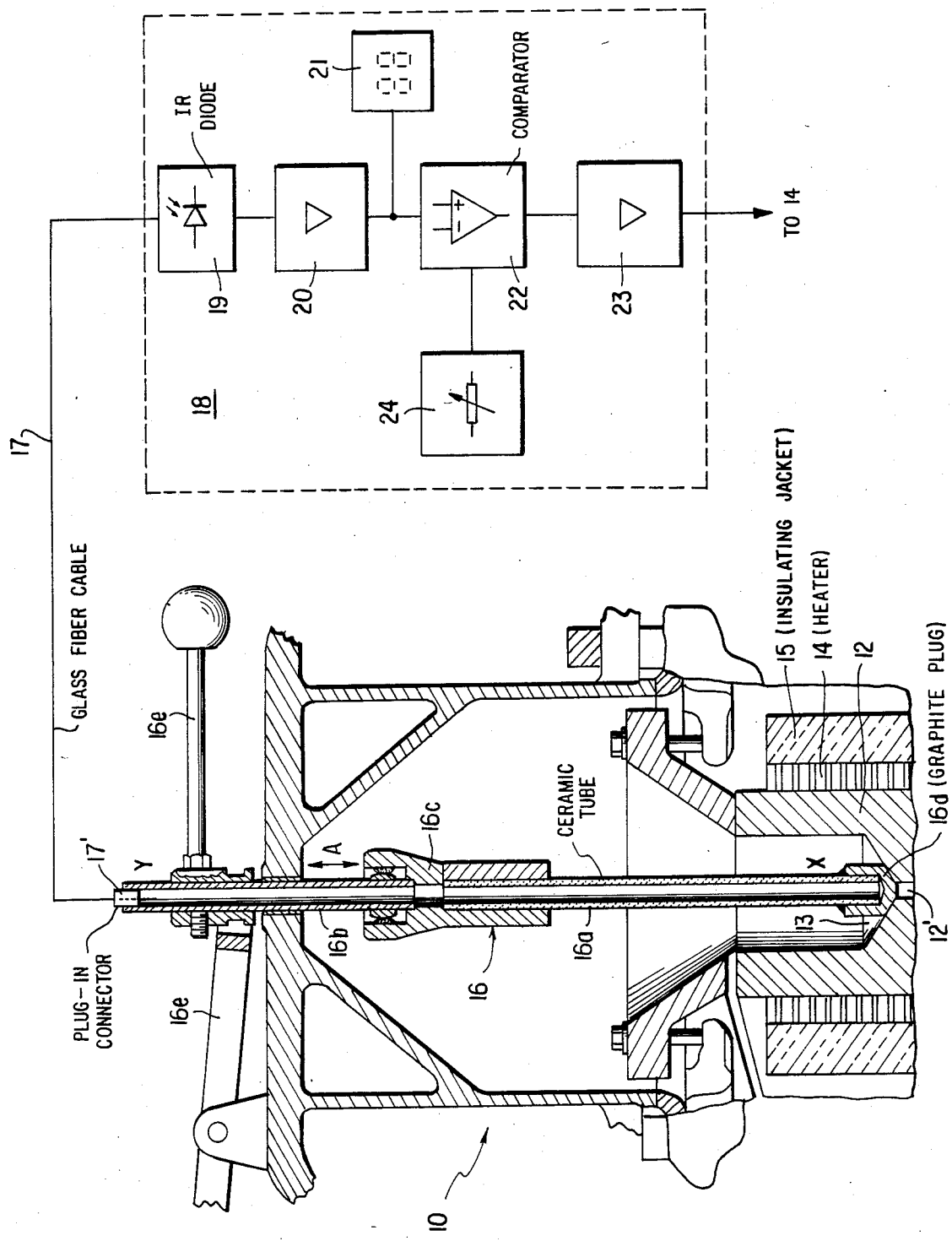

TEMPERATURE MEASURING ARRANGEMENT FOR A CAST METAL FURNACE

BACKGROUND OF THE INVENTION

The invention relates to a temperature measuring device for the furnace of a metal caster, the device including a crucible holding the metal melt to be measured and covered by a controlled atmosphere bell, with the temperature measuring device being an electro-optical radiation pyrometer including an infra-red (IR) diode for detecting the thermal radiation of the metal melt.

When metals are melted for casting, it is very important to prevent the access of air to the metal melt, particularly because of the differences in moisture content. Known metal casting devices are therefore provided with a controlled atmosphere bell above the crucible holding the metal melt so as to assure a closed controlled atmosphere above the metal melt.

On the other hand, for the production of perfect casting results, it is very important to always know the precise temperature of the metal melt in the crucible. However, the production of the above-mentioned controlled atmosphere by means of the controlled atmosphere bell brings with it the difficulty of measuring the liquid metals disposed in the metal melt in the controlled atmosphere bell with respect to their temperature.

Thermocouples are known for this purpose which are guided into the metal melt from the top through the controlled atmosphere bell. However, this solution has the drawback that if such a temperature measuring device breaks, the contents of the crucible, for example a gold alloy, are soiled and can no longer be used without resorting to a refining plant.

Another known solution therefore provides the use of a radiation pyrometer for temperature measurements. Such a pyrometer is known to be suitable and also adapted for measuring the radiation of a "blackbody". In practice, however, the object to be measured is not an ideal blackbody but a metal surface in solid or liquid state, with or without an oxide layer and additional surface movement in inductive melting processes.

Although the temperature measuring devices employing radiation pyrometers operate relatively without inertia, due to the stated deviations from the ideal state of the blackbody, they operate somewhat imprecisely. This has brought about difficulties again and again in the realization of reproducible smelting processes and casting temperatures.

SUMMARY OF THE INVENTION

It is therefore an object of the invention to improve a temperature measuring device employing a radiation pyrometer so that greater measuring accuracy can be realized.

This is accomplished according to the invention in that a graphite body is provided which terminates one end of a hollow tube guided into the controlled atmosphere bell, which body can be immersed into the metal melt and whose radiation is fed to the IR diode from the other end of the tube.

Thus, the idea of the invention is to use a graphite body, which is used in any case in the known devices as a closing plug for the crucible outlet channel, simultaneously as the radiation source for a radiation pyrometer. This is particularly favorable because, on the one hand, this body comes very close to the ideal concept of a "blackbody" and, on the other hand, has such an inertial characteristic when dipped into the metal melt that, on the one hand, it is able to follow changes in temperature of the metal melt with sufficient speed but, on the other hand, does not record uninteresting local temperature fluctuations. The surface of the graphite body facing the lower end of the hollow tube therefore has highly accurately the same temperature as the average temperature of the metal melt. The infrared thermal radiation emanating from the graphite body corresponds essentially to the theoretically ideal blackbody radiation. This radiation measurement is thus independent of the contents of the melting crucible, the type of metal alloy and the fill level of the crucible.

One advantageous embodiment of the invention provides that a plug-in glass fiber cable is connected to the other end of the tube, with the IR diode being disposed at the end of that cable.

This configuration has the result that the infrared signal coming from the graphite body, after passing through the hollow tube, is coupled into the end of a glass fiber cable and is fed from there to the IR measuring diode, away from the region of the metal caster. This has the advantage that the IR diode can remain where the other components for evaluation and control are disposed, i.e., for example, in an instrument cubicle or control panel. With the spatially separate arrangement of the metal caster itself, the IR diode also remains uninfluenced by temperature or other influences from the metal caster and thus reproduces an unfalsified measuring result uninfluenced by the thermal radiation of the melting and casting system.

According to another feature of the invention, this modification is realized by a plug-in connection between the lower ceramic pipe supporting the graphite body and an upper steel holding pipe into which the optical cable can simply be plugged.

In the totality of its features, the temperature measuring device according to the invention makes it possible, in cooperation with known electronic components for regulating the heating device for the crucible and due to the high precision of the temperaure measurement and its low inertia, to attain very high regulating accuracy with a short start-up time until the given desired temperature is reached.

BRIEF DESCRIPTION OF THE DRAWING

The FIGURE shows a preferred embodiment of the invention with the left-hand portion showing a schematic longitudinal sectional view of part of a metal caster, and in particular the part used for forming and providing the metal melt, having an exterior configuration as is customary in the trade.

DETAILED DESCRIPTION OF THE PREFERRED EMBODIMENT

Referring now to the FIGURE, there is shown the upper portion of a metal caster 10, and in particular the furnace portion for preparing and supplying the metal melt. As shown, the metal melt 13 is disposed in a crucible 12. Crucible 12 is surrounded by a heating device 14 which, on its exterior, is provided with an insulating layer 15. By means of a regulating circuit 18, the heating device 14 is regulated in such a way that the metal melt 13 in crucible 12 reaches the desired casting temperature.

Above crucible 12, there is fastened a controlled atmosphere bell 11 which produces a closed controlled atmosphere above the surface of metal melt 13. Coaxially with crucible 12, a tube 16 is brought through the upper surface of the controlled atmosphere bell 11, with the lower end of the tube 16 being terminated by a graphite body 16d. Part of the hollow tube 16 dips or extends into the graphite body 16d which itself blocks the lower outlet 12' of the crucible 12 so that the body 16d dips, at least in part, into the metal melt 13. To open and close the outlet 12' of the crucible 12, the tube 16 can be displaced vertically in the direction of double arrow A by means of a setting mechanism 16e.

Tube 16 is composed of a lower ceramic pipe 16a which receives graphite body 16d at its lower end X and an upper steel pipe 16b serving as a mount and projecting, with its upper end Y, from the controlled atmosphere bell 11.

In the region of the controlled atmosphere, i.e., within the bell 11, both pipe sections 16a and 16b are connected by means of a coupling muff 16c.

At the upper end Y of tube 16 or of steel pipe 16b, which serves as a mount, one end of a glass fiber cable 17 is held in a plug-in connection 17'. The other end of the cable 17 is connected with the regulating circuit 18 and is there brought to an IR diode 19.

In a known manner, the conventional components for amplifying and evaluating the infrared temperature signal follow the IR diode 19. These include an amplifier 20, a display 21, a comparison circuit 22 (comparator) having an associated setting member 24, and a further amplifier 23 with which the comparison signal obtained from the comparator is amplified and fed, possibly via further circuit elements, to the heating device 14 for crucible 12, thus closing the regulating circuit.

The temperature measuring device according to the invention operates as follows:

After preparing the caster 10, the desired temperature for the metal melt 13 is set at the setting member 24. From the actually measured temperature signal and the given desired value, comparator 22 produces a setting signal which is fed to the heating device 14 via amplifier 23, and heating device 14 begins to heat crucible 12. The rising temperature of the metal melt 13 causes the immersed graphite body 16d to be heated correspondingly, with its temperature following the temperature of the metal melt 13 with only a slight delay. Consequently, graphite body 16d produces thermal radiation at its frontal face facing the open end of pipe 16a, with this radiation having a characteristic which rather exactly corresponds to the thermal radiation of a blackbody having the temperature of metal melt 13. This thermal radiation is coupled into glass fiber cable 17 via tube 16 and fed to IR diode 19. The rising temperature of metal melt 13 then causes, in a known manner (not shown), the setting signal to be reduced so that casting can take place once the desired temperature is reached.

The temperature measuring device according to the invention can of course also be used manually without the described control loop (that is, without components 22 to 24), if heating device 14 is operated manually on the basis of temperature display 21.

The electronic components used in control circuit 18 are commercially available integrated circuits, for example those made by Siemens, Analog Devices, Motorola and the like.

The metal caster employed (aside from the configuration of tube 16) is a commercially available product made by INRESA Schultheiss GmbH, D-7530 Pforzheim, Federal Republic of Germany.

I claim:

1. In a cast metal furnace including a crucible having an outlet channel at its lower end and containing a metal melt, and a controlled atmosphere bell covering said crucible, an arrangement for measuring the temperature of the metal melt in said crucible comprising in combination: a vertically oriented hollow tube extending through said controlled atmosphere bell so that its lower and upper ends are disposed inside and outside of said bell respectively; means for mounting said tube on said bell so that said tube is vertically displaceable; a graphite body terminating said lower end of said tube, said graphite body extending into the metal melt in said crucible and forming a closing plug for said outlet channel of said crucible and emanating nearly ideal blackbody thermal radiation; an electro-optical radiation pyrometer, including an infra-red detector, disposed outside of said furnace; and a glass fiber cable, having one of its ends connected to said other end of said hollow tube and its other end coupled to said infra-red detector, for conducting the thermal radiation emanating from said graphite body to said infra-red detector.

2. The apparatus according to claim 1 wherein said one end of said glass fiber cable is connected to said other end of said hollow tube via a plug-in connector.

3. The apparatus according to claim 2 wherein said detector connected to said other end of said glass fiber cable, which has a length of approximately 2 to 4 m, is an infra-red diode.

4. The apparatus according to claim 1 wherein said hollow tube is composed of a lower ceramic pipe whose lower end is terminated by said graphite body, an upper steel pipe which extends through said controlled atmosphere bell, and a coupling muff connecting both pipes together.

5. The apparatus according to claim 1 wherein said detector is an infra-red diode and said glass fiber cable has a length of approximately 2 to 4 m.

* * * * *